(12) United States Patent
Chuang

(10) Patent No.: US 8,981,838 B1
(45) Date of Patent: Mar. 17, 2015

(54) HALF-RATIO CHARGE PUMP CIRCUIT

(71) Applicant: Himax Technologies Limited, Tainan (TW)

(72) Inventor: Chen-Jung Chuang, Tainan (TW)

(73) Assignee: Himax Technologies Limited, Tainan (TW)

( * ) Notice: Subject to any disclaimer, the term of this patent is extended or adjusted under 35 U.S.C. 154(b) by 12 days.

(21) Appl. No.: 14/026,032

(22) Filed: Sep. 13, 2013

(51) Int. Cl.
*G05F 1/10* (2006.01)
*G05F 3/02* (2006.01)
*H02M 3/07* (2006.01)

(52) U.S. Cl.
CPC .......... *H02M 3/07* (2013.01); *H02M 2003/072* (2013.01)
USPC .......................................................... 327/536

(58) Field of Classification Search
USPC .......................................................... 327/536
See application file for complete search history.

(56) References Cited

U.S. PATENT DOCUMENTS 6,674,317 B1 * 1/2004 Chou ............................ 327/536

* cited by examiner

*Primary Examiner* — Hai L Nguyen
(74) *Attorney, Agent, or Firm* — WPAT, PC; Justin King

(57) ABSTRACT

A half-ratio charge pump circuit includes a flying capacitor electrically coupled between a first node and a second node. Eight switches are controlled to carry out first to fourth operating phases during which charges are stored on and transferred from the flying capacitor, thereby generating a positive output voltage at approximately half the positive input voltage, and generating a negative output voltage at approximately half the negative input voltage.

12 Claims, 3 Drawing Sheets

HALF-RATIO CHARGE PUMP CIRCUIT

BACKGROUND OF THE INVENTION

1. Field of the Invention

The present invention generally relates to a charge pump circuit, and more particularly to a half-ratio charge pump circuit that generates an output voltage at approximately half the input voltage.

2. Description of Related Art

A charge pump circuit is one of power converters that convert a source of direct current (DC) from one voltage level to another voltage level. The charge pump circuit commonly uses capacitors as energy storage elements to generate either a higher or lower voltage power. The charge pump circuit may commonly be adopted at I/O level, for example, of a source driver for driving a liquid crystal display (LCD).

Multiple capacitors, typically known as flying capacitors, are required in the charge pump circuit for generating positive and negative output voltages, respectively. It is known that the capacitor with significant capacitance will occupy a substantial circuit area, which is unfavorable for an integrated circuit design.

High-voltage devices such as high-voltage transistors are also required in the charge pump circuit for obtaining a voltage level comparable with the I/O level, for example, of the source driver. In addition to their stringent design requirements, the high-voltage devices take up more layout area than low-voltage devices.

Low-dropout (LDO) regulator or circuit is commonly used to construct a power converter to generate an output voltage at half the input voltage adaptable to the source driver. One disadvantage of the LDO circuit, however, is its low power efficiency.

For the foregoing reasons, a need has arisen to propose a novel charge pump circuit for generating specific output voltages with simpler circuit architecture and less layout area.

SUMMARY OF THE INVENTION

In view of the foregoing, it is an object of the embodiment of the present invention to provide a half-ratio charge pump circuit with high power efficiency and small layout area, in which a single flying capacitor is used to generate a positive output voltage at approximately half the positive input voltage, and generate a negative output voltage at approximately half the negative input voltage.

According to one embodiment, a half-ratio charge pump circuit includes a flying capacitor, eight switches, a first reservoir capacitor and a second reservoir capacitor. The flying capacitor is electrically coupled between a first node and a second node. The eight switches including first to eighth switches are controlled to carry out first to fourth operating phases during which charges are stored on and transferred from the flying capacitor. The first reservoir capacitor is electrically coupled to the first node via the third switch, and the second reservoir capacitor is electrically coupled to the second node via the fourth switch. A positive input voltage is electrically coupled to the first node via the first switch, a negative input voltage is electrically coupled to the second node via the second switch, the first node is electrically coupled to ground via the fifth switch, the second node is electrically coupled to ground via the sixth switch, the first node provides a positive output voltage via the seventh switch, and the second node provides a negative output voltage via the eighth switch, thereby generating the positive output voltage at approximately half the positive input voltage, and generating the negative output voltage at approximately half the negative input voltage.

DETAILED DESCRIPTION OF THE INVENTION

Figure 1:
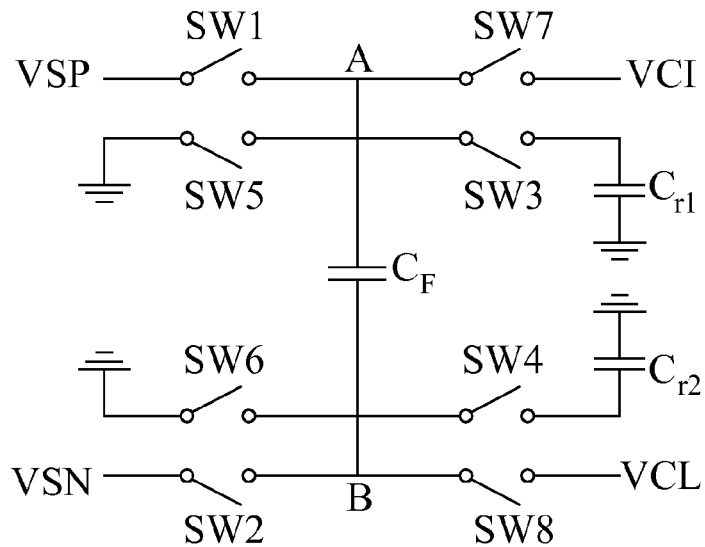
FIG. 1 shows a circuit diagram illustrating a half-ratio charge pump circuit according to one embodiment of the present invention.

FIG. 1 shows a circuit diagram illustrating a half-ratio charge pump circuit 100 according to one embodiment of the present invention. The charge pump circuit 100 receives a positive input voltage VSP and a negative input voltage VSN. The charge pump circuit 100 accordingly generates a positive output voltage VCI at approximately half the positive input voltage VSP, and generates a negative output voltage VCL at approximately half the negative input voltage VSN. The charge pump circuit 100 is called "half-ratio" charge pump on the basis that a ratio of the output voltage VCI/CL and the input voltage VSP/VSN is approximately a half.

The charge pump circuit 100 of the embodiment includes a flying capacitor $C_F$ electrically coupled between a first node A and a second node B. It is noted that the embodiment uses only one flying capacitor $C_F$, instead of two flying capacitors as in conventional counterparts. In the embodiment, eight switches SW1-SW8 are utilized and then controlled (for example, by a controller) to carry out four operating phases 1 to 4 during which charges may be stored and then transferred. It is appreciated that a person skilled in the pertinent art would implement each of the switches SW1-SW8 by using conventional electronic devices such as metal-oxide-semiconductor (MOS) transistors. Otherwise stated, the term "switch" in the specification may be referred generally to a switching electronic device, rather than strictly to a mechanical switching element. It is appreciated that complementary MOS (CMOS) manufacturing technology may be well adapted to the circuit architecture illustrated in the embodiment.

It is further noted that the embodiment may use only low-voltage (LV) devices such as LV MOS transistors, compared with conventional counterparts requiring some high-voltage (HV) devices. As a result, the embodiment demands less layout area to achieve high power efficiency than the conventional counterparts. In the specification, the term "high voltage (or HV)" or "low voltage (or LV)" is a relative notion, depending on the technology and application. For example, low voltage may be defined as any voltage lower than a nominal (low) voltage, e.g., 5V, 3.3V or even lower, and high voltage may thus be any voltage higher than the nominal voltage. High-voltage devices may commonly be adopted at I/O level of an electronic system, for example, a source driver for driving a liquid crystal display (LCD).

Referring to FIG. 1, specifically speaking, the positive input voltage VSP may be electrically coupled to the first node A via a first switch SW1, and the negative input voltage VSN may be electrically coupled to the second node B via a second switch SW2. A first reservoir capacitor $C_{r1}$ may be electrically coupled to the first node A via a third switch SW3, and a second reservoir capacitor $C_{r2}$ may be electrically coupled to the second node B via a fourth switch SW4. The first/second reservoir capacitor $C_{r1}/C_{r2}$ may typically be directed to smoothing pulse signals. In the embodiment, the capacitances of the first/second reservoir capacitor $C_{r1}/C_{r2}$ and the flying capacitor $C_F$ are substantially the same. The first node A may be electrically coupled to ground via a fifth switch SW5, and the second node B may be electrically coupled to ground via a sixth switch SW6. The first node A may provide the positive output voltage VCI via a seventh switch SW7, and the second node B may provide the negative output voltage VCL via an eighth switch SW8.

Figure 2:
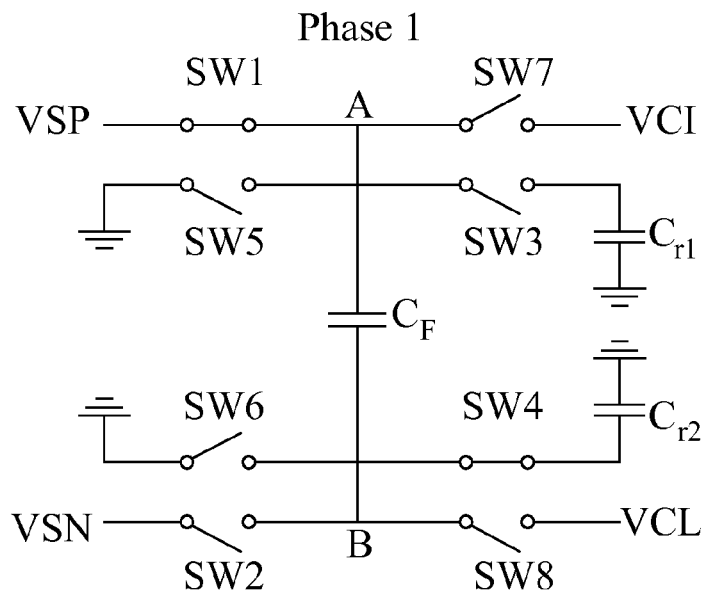
FIG. 2 to FIG. 5 show the charge pump circuits of FIG. 1 with switches closed or opened complying with operating phases 1-4 of the embodiment, respectively.

FIG. 2 shows the charge pump circuit 100 of FIG. 1 with switches closed or opened complying with a first operating phase of the embodiment. Specifically, in the operating phase 1, the first switch SW1 and the fourth switch SW4 are closed, and other switches (that is, SW2-SW3 and SW5-SW8) are opened. Accordingly, the positive input voltage VSP charges the flying capacitor $C_F$ (via the closed first switch SW1) and charges the second reservoir capacitor $C_{r2}$ (via the closed fourth switch SW4). As a result, charges corresponding to the positive input voltage VSP may be stored on the flying capacitor $C_F$ and the second reservoir capacitor $C_{r2}$. Therefore, the flying capacitor $C_F$ may be charged to a voltage (at the first node A with respect to the second node B) at approximately half the positive input voltage VSP.

Figure 3:
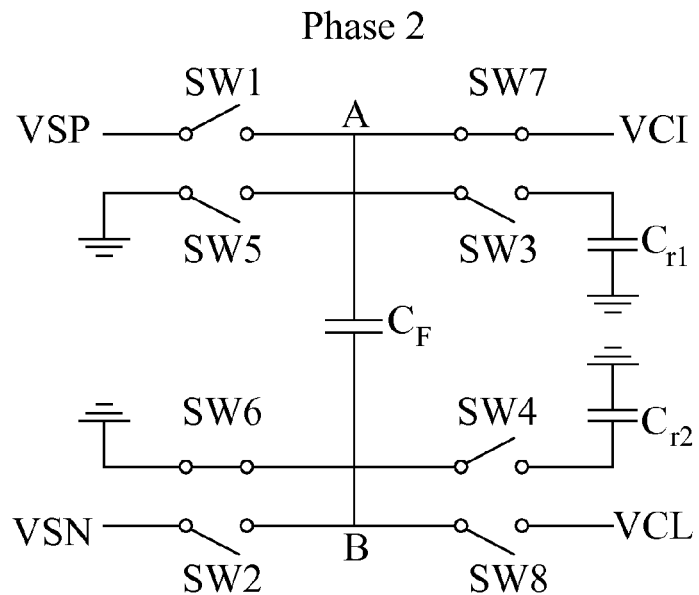

Subsequently, in the operating phase 2, as shown in FIG. 3, the sixth switch SW6 and the seventh switch SW7 are closed, and other switches (that is, SW1-SW5 and SW8) are opened. Accordingly, the charges stored on the flying capacitor $C_F$ in the previous operating phase (i.e., the first operating phase) may be transferred (via the closed seventh switch SW7) from the first node A. As a result, a voltage at approximately half the positive input voltage VSP may be provided as the positive output voltage VCI.

Figure 4:
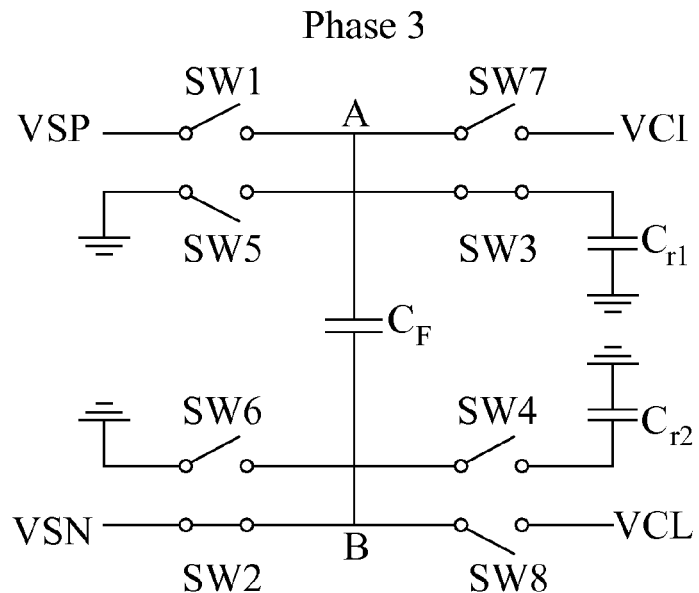

In the following operating phases (i.e., the third and the fourth operating phases), the negative output voltage VCL may be obtained in a manner similar to the operations performed in the first and the second operating phases to obtain the positive output voltage VCI. FIG. 4 shows the charge pump circuit 100 of FIG. 1 with switches closed or opened complying with the third operating phase of the embodiment. Specifically, in the operating phase 3, the second switch SW2 and the third switch SW3 are closed, and other switches (that is, SW1 and SW4-SW8) are opened. Accordingly, the negative input voltage VSN charges the flying capacitor $C_F$ (via the closed second switch SW2) and charges the first reservoir capacitor $C_{r1}$ (via the closed third switch SW3). As a result, charges corresponding to the negative input voltage VSN may be stored on the flying capacitor $C_F$ and the first reservoir capacitor $C_{r1}$. Therefore, the flying capacitor $C_F$ may be charged to a voltage (at the second node B with respect to the first node A) at approximately half the negative input voltage VSN.

Figure 5:
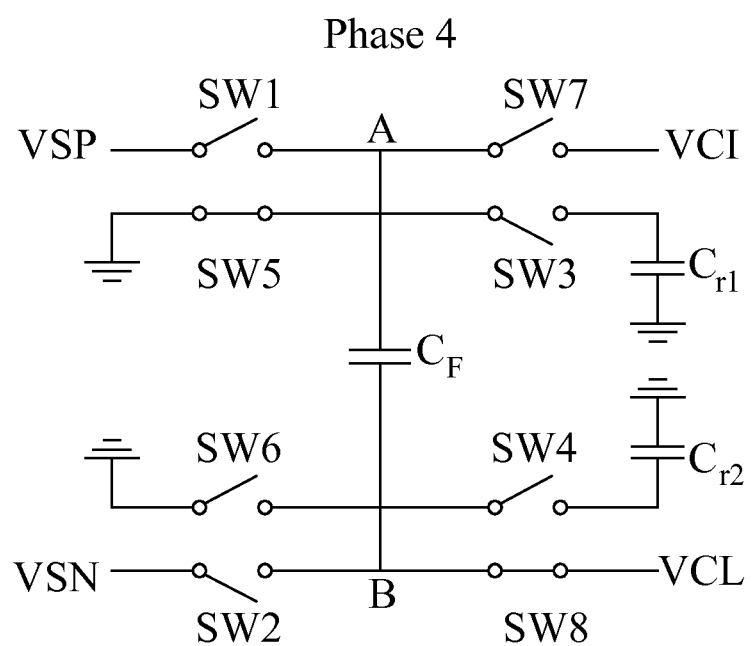

Subsequently, in the operating phase 4, as shown in FIG. 5, the fifth switch SW5 and the eighth switch SW8 are closed, and other switches (that is, SW1-SW4 and SW6-SW7) are opened. Accordingly, the charges stored on the flying capacitor $C_F$ in the previous operating phase (i.e., the third operating phase) may be transferred (via the closed eighth switch SW8) from the second node B. As a result, a voltage at approximately half the negative input voltage VSN may be provided as the negative output voltage VCL.

According to the embodiment described above, the charge pump circuit 100 as illustrated above uses only one flying capacitor $C_F$, which is used as the flying capacitor of a positive charge pump in the operating phases 1-2, and is used as the flying capacitor of a negative charge pump in the operating phases 3-4. In other words, the charge pump circuit 100 of the embodiment may be used as the positive charge pump and the negative charge pump in turn, and the single flying capacitor $C_F$ is shared for the operating phases 1-2 and the operating phases 3-4.

Moreover, the charge pump circuit 100 of the embodiment consumes less current compared with, for example, the conventional power converter implemented using the LDO. Therefore, the charge pump circuit 100 of the embodiment possesses higher power efficiency than the conventional counterpart.

Although specific embodiments have been illustrated and described, it will be appreciated by those skilled in the art that various modifications may be made without departing from the scope of the present invention, which is intended to be limited solely by the appended claims.

What is claimed is:

1. A half-ratio charge pump circuit, comprising:
a flying capacitor electrically coupled between a first node and a second node;
eight switches including first to eighth switches controlled to carry out first to fourth operating phases during which charges are stored on and transferred from the flying capacitor;
a first reservoir capacitor electrically coupled to the first node via the third switch; and
a second reservoir capacitor electrically coupled to the second node via the fourth switch;
wherein a positive input voltage is electrically coupled to the first node via the first switch, a negative input voltage is electrically coupled to the second node via the second switch, the first node is electrically coupled to ground via the fifth switch, the second node is electrically coupled to ground via the sixth switch, the first node provides a positive output voltage via the seventh switch, and the second node provides a negative output voltage via the eighth switch, thereby generating the positive output voltage at approximately half the positive input voltage, and generating the negative output voltage at approximately half the negative input voltage.

2. The half-ratio charge pump circuit of claim 1, wherein the first to eighth switches comprise metal-oxide-semiconductor (MOS) transistors.

3. The half-ratio charge pump circuit of claim 1, wherein the first to eighth switches comprise no high-voltage (HV) devices.

4. The half-ratio charge pump circuit of claim 1, wherein capacitances of the first reservoir capacitor, the second reservoir capacitor and the flying capacitor are substantially the same.

5. The half-ratio charge pump circuit of claim 1, wherein, in the first operating phase, the first switch and the fourth switch are closed, and other switches of said eight switches are opened, thereby charging the flying capacitor to a voltage at approximately half the positive input voltage.

6. The half-ratio charge pump circuit of claim 5, wherein, in the first operating phase, the positive input voltage charges the flying capacitor and the second reservoir capacitor, thereby charges corresponding to the positive input voltage being stored on the flying capacitor and the second reservoir capacitor.

7. The half-ratio charge pump circuit of claim 5, wherein, in the second operating phase, the sixth switch and the seventh switch are closed, and other switches of said eight switches are opened, thereby the voltage at approximately half the positive input voltage being provided as the positive output voltage.

8. The half-ratio charge pump circuit of claim 7, wherein, in the second operating phase, the charges stored on the flying capacitor in the first operating phase are transferred from the first node.

9. The half-ratio charge pump circuit of claim 7, wherein, in the third operating phase, the second switch and the third switch are closed, and other switches of said eight switches are opened, thereby charging the flying capacitor to a voltage at approximately half the negative input voltage.

10. The half-ratio charge pump circuit of claim 9, wherein, in the third operating phase, the negative input voltage charges the flying capacitor and the first reservoir capacitor, thereby charges corresponding to the negative input voltage being stored on the flying capacitor and the first reservoir capacitor.

11. The half-ratio charge pump circuit of claim 9, wherein, in the fourth operating phase, the fifth switch and the eighth switch are closed, and other switches of said eight switches are opened, thereby the voltage at approximately half the negative input voltage being provided as the negative output voltage.

12. The half-ratio charge pump circuit of claim 11, wherein, in the fourth operating phase, the charges stored on the flying capacitor in the third operating phase are transferred from the second node.

* * * * *